(12) United States Patent
Sasaki et al.

(10) Patent No.: US 11,202,211 B2
(45) Date of Patent: Dec. 14, 2021

(54) OAM MULTIPLEXING COMMUNICATION SYSTEM AND OAM MULTIPLEXING COMMUNICATION METHOD

(71) Applicant: NIPPON TELEGRAPH AND TELEPHONE CORPORATION, Tokyo (JP)

(72) Inventors: Hirofumi Sasaki, Yokosuka (JP);
Doohwan Lee, Yokosuka (JP);
Hiroyuki Fukumoto, Yokosuka (JP);
Hiroyuki Shiba, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 87 days.

(21) Appl. No.: 16/650,370

(22) PCT Filed: Sep. 25, 2018

(86) PCT No.: PCT/JP2018/035537
§ 371 (c)(1),
(2) Date: Mar. 24, 2020

(87) PCT Pub. No.: WO2019/059408
PCT Pub. Date: Mar. 28, 2019

(65) Prior Publication Data
US 2020/0296599 A1   Sep. 17, 2020

(30) Foreign Application Priority Data

Sep. 25, 2017  (JP) .............................. JP2017-183842
Sep. 25, 2017  (JP) .............................. JP2017-183844

(51) Int. Cl.
*H04W 16/28*   (2009.01)
*H04B 7/06*    (2006.01)

(52) U.S. Cl.
CPC .......... *H04W 16/28* (2013.01); *H04B 7/0617* (2013.01)

(58) Field of Classification Search
CPC ... H04W 84/042; H04W 88/06; H04W 88/02; H04W 88/16; H04W 76/14
(Continued)

(56) References Cited

U.S. PATENT DOCUMENTS

| 10,148,009 | B2 * | 12/2018 | Klemes | ................. | H01Q 21/20 |
| 10,224,641 | B2 * | 3/2019  | Sundaram | ............... | H01Q 1/24 |
| 10,228,443 | B2 * | 3/2019  | Kulaib | ...................... | G01S 3/74 |
| 2003/0076274 | A1 | 4/2003 | Phelan et al. | | |
| 2003/0235255 | A1 | 12/2003 | Ketchum et al. | | |

(Continued)

FOREIGN PATENT DOCUMENTS

| JP | 2010136396 A | 6/2010 |
| JP | 2011160458 A | 8/2011 |

(Continued)

OTHER PUBLICATIONS

Lee, Doohwan, et al. "Orbital Angular Momentum (OAM) Multiplexing: An Enabler of a New Era of Wireless Communications." IEICE Transactions on Communications, Jul. 2017, www.jstage.jst.go.jp/article/transcom/E100.B/7/E100.B_2016SCI0001/_pdf. (Year: 2017).*

(Continued)

*Primary Examiner* — Shuwang Liu
*Assistant Examiner* — Gina M Mckie
(74) *Attorney, Agent, or Firm* — Harness, Dickey & Pierce, P.L.C.

(57) ABSTRACT

In an OAM multiplexing communication system that subjects a plurality of signal sequences to multiplex transmission by using an OAM mode, a transmitting station includes a transmitting antenna using an M-UCA formed of a plurality of UCAs, and a unit performing basis transformation in each of the rotational direction dimension and a diameter direction dimension in a polar coordinate system having a (Continued)

center of UCAs as an origin, and subjecting the plurality of signal sequences to multiplex transmission for each complex mode formed by a combination of different bases in each dimension. A receiving station includes a receiving antenna using an M-UCA, and a unit receiving a signal subjected to multiplex transmission from the transmitting station, performing basis transformation in each of the rotational direction dimension and the diameter direction dimension by using the received signal, and demultiplexing the plurality of signal sequences subjected to the multiplex transmission.

10 Claims, 9 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2010/0135203 A1 | 6/2010 | Maru | |
| 2010/0172421 A1 | 7/2010 | Okamura et al. | |
| 2010/0329375 A1 | 12/2010 | Nakayama | |
| 2012/0014279 A1 | 1/2012 | Miyoshi et al. | |
| 2013/0235744 A1* | 9/2013 | Chen | H04L 47/82 370/252 |
| 2015/0372398 A1* | 12/2015 | Dudorov | H01Q 19/062 342/368 |
| 2017/0026095 A1 | 1/2017 | Ashrafi et al. | |
| 2020/0296599 A1 | 9/2020 | Sasaki et al. | |

FOREIGN PATENT DOCUMENTS

| | | |
|---|---|---|
| WO | WO-2009017230 A1 | 2/2009 |
| WO | WO-2009096316 A1 | 8/2009 |
| WO | WO-2010098078 A1 | 9/2010 |
| WO | WO-2016148262 A1 | 9/2016 |

OTHER PUBLICATIONS

J. Wang et al., "Terabit free-space data transmission employing orbital angular momentum multiplexing", Nature Photonics, vol. 6, pp. 488-pp. 496, Jul. 2012.

Z. Li et al., "A Dual-channel Wireless Communication System by Multiplexing Twisted Radio Wave", Proceedings of the 44th European Microwave Conference, pp. 235-pp. 238, Oct. 6-9, 2014.

Yuan, Yuqing et al., "Capacity analysis of UCA-based OAM multiplexing communication system", 2015 International Conference on Wireless Communications & Signal Processing (WCSP), Oct. 17, 2015.

Edfors, Ove et al., "Is Orbital Angular Momentum (OAM) Based Radio Communication an Unexploited Area?", IEEE Transactions on Antennas and Propagation, vol. 60, issue: 2, Feb. 2012, pp. 1126-1131.

Opare, Kwasi A. et al., "Performance of an Ideal Wireless Orbital Angular Momentum Communication System Using Multiple-input Multiple-output Techniques", 2014 International Conference on Telecommunications and Multimedia (TEMU), Jun. 30, 2014.

International Search Report (English and Japanese) issued in PCT/JP2018/035537, dated Dec. 18, 2018; ISA/JP.

U.S. Appl. No. 16/650,376, filed Mar. 24, 2020, Hirofumi Sasaki et al.

E. Sasaki et al., "Pragmatic OAM with Polarization Multiplexing Transmission for future 5G Ultra-High Capacity Radio", Proceedings of the 46th European Microwave Conference, pp. 154-pp. 157, Oct. 4-6, 2016.

Opare, Kwasi A. et al., "Performance of an Ideal Wireless Orbital Angular Momentum Communication System Using Multiple-input Multiple-output Techniques", 2014 International Conference on Telecommunications and Multimedia (TEMU), Jun. 30, 2014, pp. 144-149.

International Search Report (English and Japanese) issued in PCT/JP2018/035535, dated Dec. 18, 2018; ISA/JP.

Orbital Angular Momentum-Based Communication with Partial Arc Sampling Receiving (Year: 2016).

Generation of Radio Orbital Angular Momentum (OAM) Waves with Circular Metallic Waveguide (Year: 2020).

Wu, Xiong et al., "Inter-Mode Crosstalk Compensation for Radio Orbital Angular Momentum Multiplexing Systems Under Misaligned Condition Using Multiple-Input Multiple-Output Techniques", 2016, 15th International Conference on Optical Communications and Networks (ICOCN). IEEE, pp. 1-3.

Chen, Rui et al., "Misalignment-Robust Receiving Scheme for UCA-Based OAM Communication Systems", 2017 IEEE 85th Vehicular Technology Conference (VTC Spring).

* cited by examiner

OAM MULTIPLEXING COMMUNICATION SYSTEM AND OAM MULTIPLEXING COMMUNICATION METHOD

CROSS REFERENCE TO RELATED APPLICATION

This application is a U.S. National Stage application claiming the benefit of prior filed International Application Number PCT/JP2018/035537, filed on Sep. 25, 2018, in which the International Application claims priority from Japanese Patent Application Number 2017-183842 and Japanese Patent Application Number 2017-183844, both filed on Sep. 25, 2017, the entire contents of which are incorporated herein by reference.

TECHNICAL FIELD

The present invention relates to an OAM multiplexing communication system and an OAM multiplexing communication method of subjecting a radio signal to spatial multiplex transmission by using orbital angular momentum (OAM) of an electromagnetic wave.

BACKGROUND ART

In recent years, in order to improve a transmission capacity, a spatial multiplex transmission technique for a radio signal using OAM has been reported. In an electromagnetic wave having OAM, an equiphase surface thereof is distributed in a spiral form along a propagation direction centering on a propagation axis. Since electromagnetic waves in different OAM modes and propagating in the same direction have spatial phase distributions orthogonal to each other in a rotational direction, respective signals in OAM modes modulated with different signal sequences are demultiplexed in a receiving station, and thus the signals can be subjected to multiplex transmission.

Up to now, beams radiated from a plurality of Horn antennae are converted into different OAM modes and coaxially combined with each other by a phase plate, to be transmitted, and thus signals are successfully subjected to coaxial multiplex transmission (Non-Patent Document 1). In addition, there is a report in which a plurality of OAM modes are generated and combined with each other by using a uniform circular array (UCA) in which a plurality of antenna elements are disposed circularly at an equal interval, to be transmitted, and thus spatial multiplex transmission of different signal sequences is performed (Non-Patent Document 2). Here, a signal in an OAM mode n is set and generated such that a phase of each antenna element of the UCA is n rotations (n×360 degrees).

Non-Patent Document 1: J. Wang et al., "Terabit free-space data transmission employing orbital angular momentum multiplexing", Nature Photonics, Vol. 6, pp. 488 to 496, July 2012.

Non-Patent Document 2: Z. Li, Y. Ohashi, K. Kasai, "A Dual-Channel Wireless Communication System by Multiplexing Twisted Radio Wave", Proceedings of 44th European Microwave Conference, pp. 235 to 238, October 2014.

DISCLOSURE

Problems to be Solved

However, OAM generated by using a UCA uses only orthogonality in a rotational direction (circumferential direction) dimension in a polar coordinate system, and thus it is difficult to satisfy that planar (two-dimensional) space resources are made the most of in beam transmission. On the other hand, when spatial multiplex transmission is performed through MIMO signal processing by using an array antenna including a plurality of antenna elements disposed in a two-dimensional manner, high resource usage efficiency can be realized, but a large amount of calculation is required for signal processing or weight multiplication for securing independent propagation.

The reception symbol vector y in MIMO transmission using a typical array antenna may be represented as in Equation (1) by using the propagation channel matrix H and the transmission symbol vector s. For simplification, a noise term is omitted.

$$y = Hs \quad (1)$$

$$H = \begin{pmatrix} h_{1,1} & \cdots & h_{1,N_{TX}} \\ \vdots & \ddots & \vdots \\ h_{N_{RX},1} & \cdots & h_{N_{RX},N_{TX}} \end{pmatrix}$$

Here, $N_{TX}$ and $N_{RX}$ respectively indicate the number of transmitting antenna elements and the number of receiving antenna elements. In this case, H may be decomposed as in Equation (2) through singular value decomposition.

$$H = U\Sigma V^H \quad (2)$$

$$\Sigma(x,y) = \begin{Bmatrix} \sqrt{\lambda_x} & (x=y) \\ 0 & (x \neq y) \end{Bmatrix}$$

Here, $\Sigma(x,y)$ indicates a component corresponding to x row and y column of the matrix $\Sigma$. In addition, at q=min $(N_{RX}, N_{TX})$, U and V are respectively matrixes of $N_{RX} \times N_{RX}$ and $N_{TX} \times N_{TX}$, and $\Sigma$ is a matrix of $N_{RX} \times N_{TX}$.

From the description, the reception side is multiplied by $U^H$, and the transmission side is multiplied by a weight of V, and thus orthogonal MIMO channels as represented in Equation (3) are formed.

$$r = U^H H V s = \Sigma s \quad (3)$$

However, the number of devices such as mixers, DA converters, and AD converters required to realize the above contents increases in proportion to the number of antenna elements, and a calculation amount required for digital signal processing such as channel estimation increases exponentially in accordance with the number of antenna elements. The digital signal processing is not only required to be performed for each sub-carrier, but a large amount of calculation based on the number of eigenvalues and the number of multi-values is also necessary when digital communication is performed by using obtained CSI information. Therefore, it is necessary to reduce the number of devices and an amount of calculation in realizing ultrafast radio transmission.

An object of the present invention is to provide an OAM multiplexing communication system and an OAM multiplexing communication method capable of generating one or more modes in a diameter direction dimension from each OAM mode and generating a plurality of complex modes in a smaller number of devices and a small amount of calculation than in the related art, in addition to an OAM mode having orthogonality in a rotational direction dimension in a polar coordinate system by using a multi-UCA (M-UCA) in which a plurality of UCAs are concentrically disposed.

Means for Solving the Problems

According to a first embodiment, an OAM multiplexing communication system that subjects a plurality of signal sequences to multiplex transmission by using an OAM mode as a base in a rotational direction dimension includes a transmitting station including a transmitting antenna using an M-UCA formed of a plurality of UCAs that are concentrically disposed, each of the UCAs having a plurality of antenna elements disposed circularly at an equal interval, and a unit performing basis transformation in each of the rotational direction dimension and a diameter direction dimension in a polar coordinate system having a center of the plurality of UCAs as an origin, and subjecting the plurality of signal sequences to multiplex transmission for each complex mode formed by a combination of different bases in each dimension; and a receiving station including a receiving antenna using an M-UCA formed of a plurality of UCAs that are concentrically disposed, and a unit receiving a signal subjected to multiplex transmission from the transmitting station, and demultiplexing the plurality of signal sequences subjected to the multiplex transmission.

The receiving station may further include a unit estimating channel information between the transmitting antenna and the receiving antenna by using a known reference signal transmitted from the transmitting station, and performing transform into a transmitting weight and a receiving weight used for basis transformation in the rotational direction and diameter direction dimensions by using the channel information; the transmitting station may further include a weight multiplication unit multiplying the plurality of signal sequences by the transmitting weight fed back from the receiving station so as to perform basis transformation in the diameter direction dimension, and an OAM mode generation unit generating a signal in the OAM mode to be transmitted from each of the plurality of UCAs; and the receiving station may further include an OAM mode separation unit separating the signal in the OAM mode from a received signal of each of the plurality of UCAs, and a weight multiplication unit multiplying the signal in the OAM mode by the receiving weight so as to perform basis transformation in the diameter direction dimension.

The transmitting station may be configured to include a function or a table in which a transmitting weight to be multiplied according to a distance between the transmitting antenna and the receiving antenna is set in advance, and multiply one or more signal sequences to be multiplexed for each OAM mode to be used by different transmitting weights so as to perform basis transformation for each of the UCAs; and the receiving station may be configured to perform basis transformation for each of the UCAs, multiply one or more signal sequences differing for each OAM mode by receiving weights corresponding to the transmitting weights used in the transmitting station, and demultiplex the plurality of signal sequences subjected to the multiplex transmission by using a predetermined equalization algorithm.

The transmitting station may be configured to determine the transmitting weight based on an orthogonal distribution function according to the distance between the antennae, and the receiving station may be configured to determine the receiving weight based on the orthogonal distribution function used in the transmitting station according to the distance between the antennae.

The transmitting station and the receiving station may further include a unit determining a combination of the transmitting weight and the receiving weight, and an orthogonal base based on reception signal quality in the available complex mode, and determining transmission power and a modulation method in the complex mode.

According to a second embodiment, an OAM multiplexing communication method of subjecting a plurality of signal sequences to multiplex transmission by using an OAM mode as a base in a rotational direction dimension includes a transmitting station uses, as a transmitting antenna, an M-UCA formed of a plurality of UCAs that are concentrically disposed, each UCA having a plurality of antenna elements disposed circularly at an equal interval, to perform basis transformation in each of the rotational direction dimension and a diameter direction dimension in a polar coordinate system having a center of the plurality of UCAs as an origin, and to subject the plurality of signal sequences to multiplex transmission for each complex mode formed by a combination of different bases in each dimension. A receiving station uses, as a receiving antenna, an M-UCA formed of the plurality of UCAs that are concentrically disposed to receive a signal subjected to multiplex transmission from the transmitting station, and to demultiplex the plurality of signal sequences subjected to multiplex transmission.

The receiving station may estimate channel information between the transmitting antenna and the receiving antenna by using a known reference signal transmitted from the transmitting station, and perform transform into a transmitting weight and a receiving weight used for basis transformation in the rotational direction and diameter direction dimensions by using the channel information; the transmitting station may multiply the plurality of signal sequences by the transmitting weight fed back from the receiving station so as to perform basis transformation in the diameter direction dimension, and generate a signal in the OAM mode to be transmitted from each of the plurality of UCAs; and the receiving station may separate the signal in the OAM mode from a received signal of each of the plurality of UCAs, and multiply the signal in the OAM mode by the receiving weight so as to perform basis transformation in the diameter direction dimension.

The transmitting station may include a function or a table in which a transmitting weight to be multiplied according to a distance between the transmitting antenna and the receiving antenna is set in advance, and multiply one or more signal sequences to be multiplexed for each OAM mode to be used by different transmitting weights so as to perform basis transformation for each UCA; and the receiving station may perform basis transformation for each of the UCAs, multiply one or more signal sequences differing for each OAM mode by receiving weights corresponding to the transmitting weights used in the transmitting station, and demultiplex the plurality of signal sequences subjected to the multiplex transmission by using a predetermined equalization algorithm.

The transmitting station may determine the transmitting weight based on an orthogonal distribution function according to the distance between the antennae; and the receiving station may determine the receiving weight based on the orthogonal distribution function used in the transmitting station according to the distance between the antennae.

The transmitting station and the receiving station may determine a combination of the transmitting weight and the receiving weight, and an orthogonal base based on reception signal quality in the available complex mode, and determine transmission power and a modulation method in the complex mode.

Effect

According to the present invention, an OAM mode is generated through basis transformation using a Fourier series or the like in a rotational direction dimension in a polar coordinate system by using an M-UCA, and then a plurality of complex modes corresponding to respective base vectors in a rotational direction are calculated in a diameter direction dimension. Therefore, signal multiplex transmission is performed by using independent transmission paths represented by combinations of different bases in the rotational direction and the diameter direction, and thus the signal multiplex transmission can be performed in a smaller calculation amount than in the related art.

DETAILED DESCRIPTION OF THE EMBODIMENTS

Figure 1:
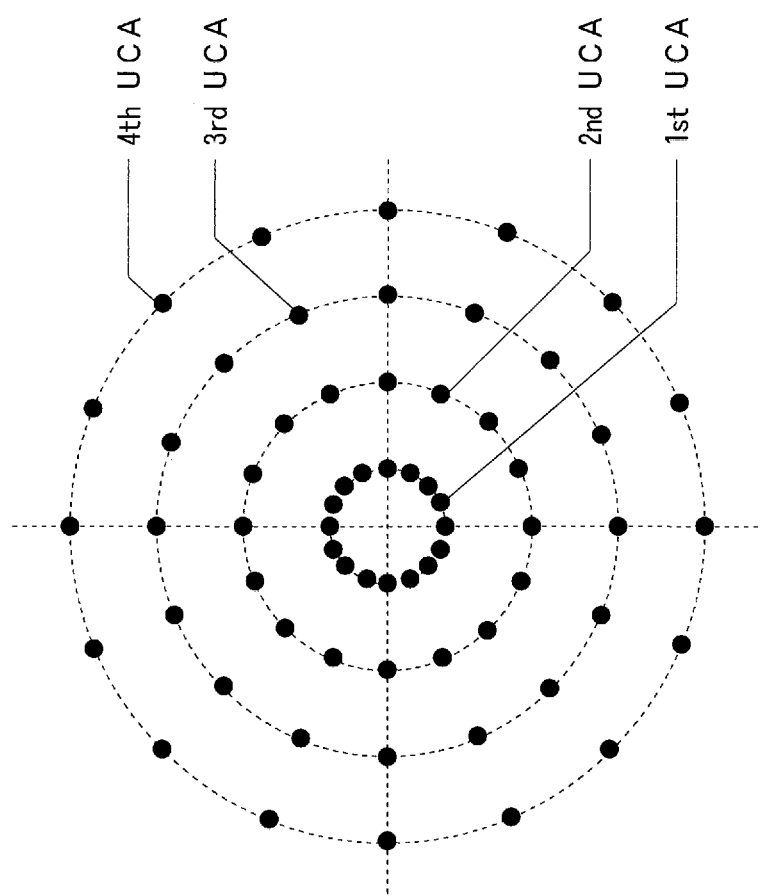
FIG. 1 is a diagram illustrating a configuration example of an M-UCA of an OAM multiplexing communication system of the present invention.

FIG. 1 is a diagram illustrating a configuration example of an M-UCA of an OAM multiplexing communication system of the present invention.

In FIG. 1, an M-UCA has a configuration in which a plurality of UCAs are disposed concentrically. Herein, a configuration in which four UCAs having different radii are disposed is illustrated, and the UCAs are referred to as a first UCA, a second UCA, a third UCA, and a fourth UCA in this order from the inner UCAs. As an example, each UCA includes 16 antenna elements (indicated by ● in FIG. 1), but the number of antenna elements of each UCA is not necessarily required to be the same. The antenna elements forming the M-UCA may be any other antennae such as Horn antennae or patch antennae.

The feature of the present invention is that, in an antenna configuration using the M-UCA and a calculation processing method according thereto, basis transformation is performed in each dimension of a diameter direction and a rotational direction of the M-UCA, and, for example, a Fourier series is used as an orthogonal base of the rotational direction.

Example 1

Figure 2:
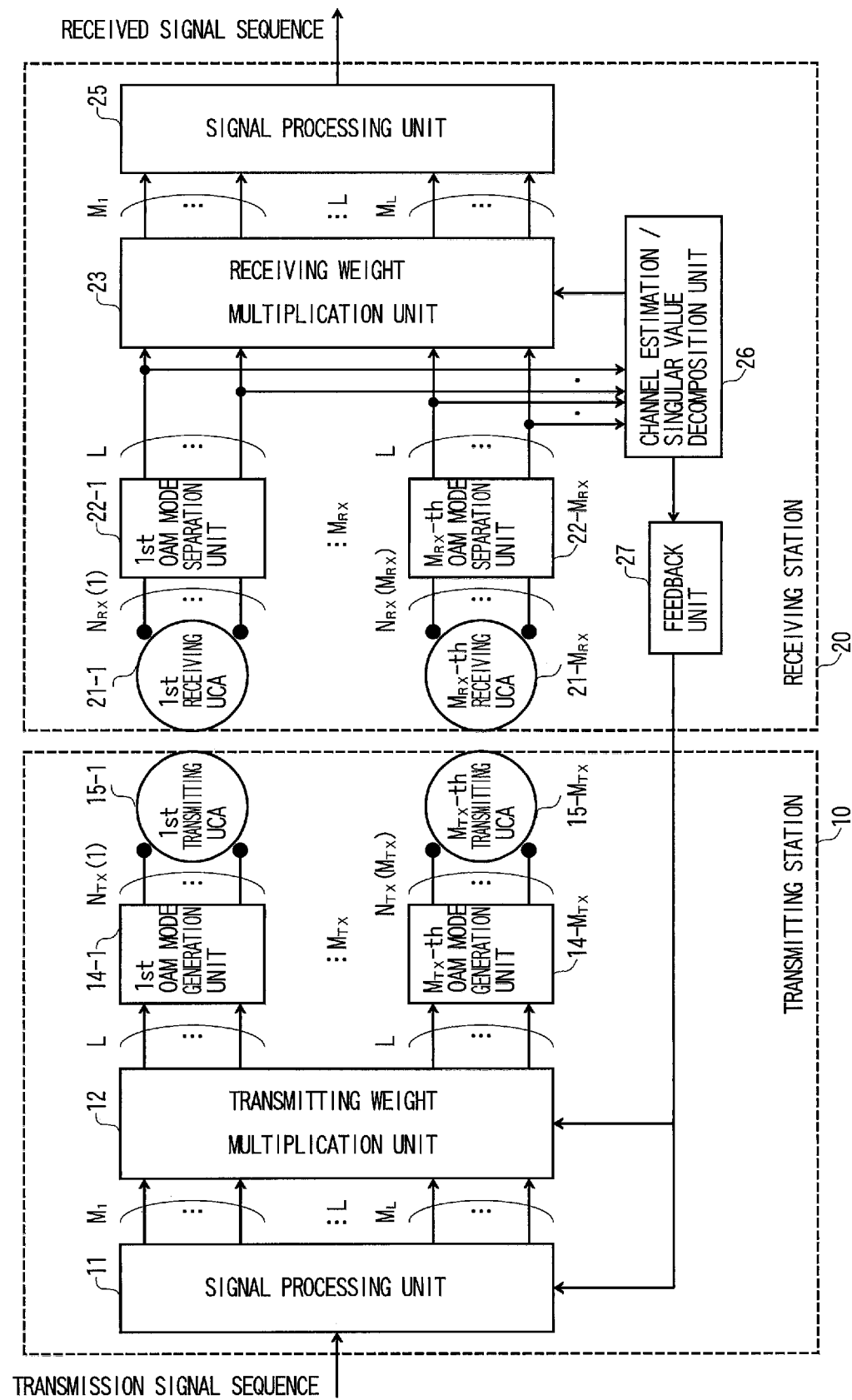
FIG. 2 is a diagram illustrating a configuration of Example 1 of the OAM multiplexing communication system of the present invention.

FIG. 2 is a diagram illustrating a configuration of Example 1 of the OAM multiplexing communication system of the present invention.

In FIG. 2, a transmitting station 10 includes a plurality of $M_{TX}$ UCAs such as a first UCA 15-1 to an $M_{TX}$-th UCA 15-$M_{TX}$, and the number of transmitting antenna elements of each thereof is $N_{TX}(1)$ to $N_{TX}(M_{TX})$. A signal processing unit 11 receives a transmission signal sequence, and generates $M_1$ to $M_L$ signals respectively transmitted in OAM modes #1 to #L. A transmitting weight multiplication unit 12 multiplies each signal generated by the signal processing unit 11 by a transmitting weight, and thus generates signals to be transmitted in the OAM modes #1 to #L from each UCA. Each of a first OAM mode generation unit 14-1 to an $M_{TX}$-th OAM mode generation unit 14-$M_{TX}$ receives the signals to be transmitted in the OAM modes #1 to #L, adjusts phases of the signals to be transmitted as signals in the OAM modes #1 to #L from each UCA, and inputs the signals to the antenna elements of each UCA.

A receiving station 20 includes a plurality of $M_{RX}$ UCAs such as a first UCA 21-1 to an $M_{RX}$-th UCA 21-$M_{RX}$, and the number of receiving antenna elements of each thereof is $N_{RX}(1)$ to $N_{RX}(M_{RX})$. Each of a first OAM mode separation unit 22-1 to an $M_{RX}$-th OAM mode separation unit 22-$M_{RX}$ separates signals in the OAM modes #1 to #L from signals received in each of the first UCA 21-1 to the $M_{RX}$-th UCA 21-$M_{RX}$. A receiving weight multiplication unit 23 receives the signal in the OAM modes #1 to #L separated for each UCA, multiplies each signal by a receiving weight, to separate signals in the same OAM mode received by the respective UCAs, and outputs the signals as $M_1$ to $M_L$ signals. A signal processing unit 25 demodulates the signal received in each UCA and each OAM mode, and outputs a received signal sequence.

The receiving station 20 includes a channel estimation/singular value decomposition unit 26 that estimates channel information of each signal sequence by using output signals from the first OAM mode separation unit 22-1 to the $M_{RX}$-th OAM mode separation unit 22-$M_{RX}$. The channel estimation/singular value decomposition unit 26 sets the estimated channel information in the receiving weight multiplication unit 23, sets the estimated channel information in the transmitting weight multiplication unit 12 of the transmitting station 10 via a channel information feedback unit 27, and also sets multiplex numbers $M_1$ to $M_L$ for each OAM mode in the signal processing unit 11.

The transmitting weight multiplication unit 12, the receiving weight multiplication unit 23, the first OAM mode generation unit 14-1 to the $M_{TX}$-th OAM mode generation unit 14-$M_{TX}$, and the first OAM mode separation unit 22-1 to the $M_{RX}$-th OAM mode separation unit 22-$M_{RX}$ may perform either one of digital signal processing and analog signal processing, and a DA converter or an AD converter is disposed at an appropriate position according to each processing method. The first OAM mode generation unit 14-1 to the $M_{TX}$-th OAM mode generation unit 14-$M_{TX}$ of the transmitting station 10, and the first OAM mode separation unit 22-1 to the $M_{RX}$-th OAM mode separation unit 22-$M_{RX}$ of the receiving station 20 are sequentially coupled to the antenna elements of the respectively corresponding UCAs in the same rotational direction.

Figure 3:
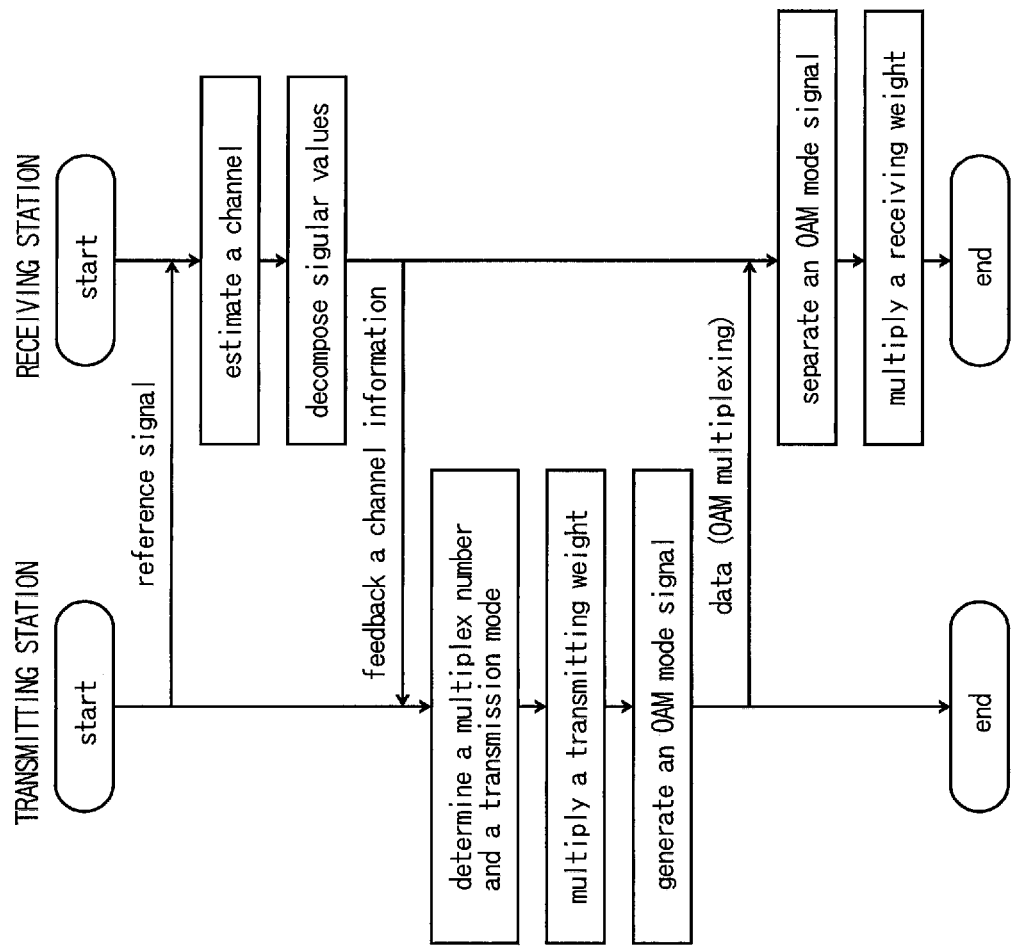
FIG. 3 is a diagram illustrating examples of process procedures of an OAM multiplexing communication method in Example 1.

FIG. 3 illustrates examples of process procedures of an OAM multiplexing communication method in Example 1.

In FIG. 3, the transmitting station 10 transmits a known reference signal, the receiving station 20 performs a channel estimation process based on the reference signal, acquires necessary channel information through a singular value decomposition process, and feeds back the channel information to the transmitting station. The transmitting station 10 determines a multiplex number and a transmission mode by using the fed-back channel information, performs a transmitting weight multiplication process so as to generate an OAM mode signal, and subjects the signal to OAM multiplexing transmission. The receiving station 20 performs a separation process on OAM mode signals received in each UCA, further performs a receiving weight multiplication process so as to separate the signals into identical OAM mode signals received by a plurality of UCAs, and outputs the signals as received signals. There may be a configuration in which a known signal is transmitted from the receiving station 20 to the transmitting station 10, and the transmitting station 10 performs channel estimation. In either configuration, a weight multiplied in each of the transmitting station 10 and the receiving station 20 may be obtained from the channel information.

Hereinafter, a description will be made of an operation principle of the present invention.

When the transmitting antennae are formed of a plurality of $M_{TX}$ first UCA 15-1 to the $M_{TX}$-th UCA 15-$M_{TX}$, the respective numbers of transmitting antenna elements thereof are $N_{TX}(1)$ to $N_{TX}(M_{TX})$, the receiving antennae are formed of a plurality of $M_{RX}$ first UCA 21-1 to the $M_{RX}$-th UCA 21-$M_{RX}$, and the respective numbers of receiving antenna elements thereof are $N_{RX}(1)$ to $N_{RX}(M_{RX})$, the propagation channel matrix H may be represented as in the following Equation (4).

$$H = \begin{bmatrix} h_{1,1} & \cdots & h_{1,M_{TX}} \\ \vdots & \ddots & \vdots \\ h_{M_{RX},1} & \cdots & h_{M_{RX},M_{TX}} \end{bmatrix} \quad (4)$$

A partial channel matrix $h_{m,n}$ (where m=1, 2, . . . , and $M_{RX}$, and n=1, 2, . . . , and $M_{TX}$) is a matrix of $N_{RX}(m) \times N_{TX}(n)$, and indicates propagation channels between the m-th receiving UCA 21-$m$ and the n-th transmitting UCA 15-$n$.

Since the transmitting antennae and the receiving antennae are disposed to face each other, and thus rotational symmetry occurs with respect to the propagation axis, a channel matrix occurring between the antennae is a circulant matrix. Thus, the propagation channel $h_{m,m}$ between the respective UCAs may be subjected to the following singular value decomposition by using the discrete Fourier transform (DFT) matrix $D_N \in C^{N*N}$.

$$h_{m,n} = D_{N_{TX}(n)} \sum_{m,n} D_{N_{RX}(m)}^H \quad (5)$$

$$\sum_{m,n}(x, y) = \begin{Bmatrix} \sqrt{\lambda_{mn,x}} & (x=y) \\ 0 & (x \neq y) \end{Bmatrix}$$

Here, $$D_N(x, y) = e^{j\left(\frac{2\pi(y-1)}{N}\right)l(x)} / \sqrt{N} \quad (x, y = 1, 2, \ldots, N) \quad (6)$$

$$l(x) = x - (\lceil N/2 \rceil + 1)$$

In addition, x and y used in Equations (5) and (6) respectively indicate indexes of a row and a column of each of the matrix Σ and the matrix D. Hereinafter, the same expression is used for an index of a matrix or a vector. In addition, l(x) is a value in a mode of a rotational direction dimension corresponding to an eigenvector of x rows of the DFT matrix, and indicates an OAM mode.

In this case, from Equation (5), the number of singular values included in a propagation channel between the respective UCAs is min[$N_{RX}(m), N_{TX}(n)$]. Thus, propagation channels between the m-th receiving UCA 21-$m$ and the n-th transmitting UCA 15-$n$ are orthogonalized as in Equation (7), and thus min[$N_{RX}(m), N_{TX}(n)$] independent propagation paths can be secured.

$$\Sigma_{m,n} = D_{N_{TX}(n)}^H h_{m,n} D_{N_{RX}(m)} \quad (7)$$

Equation (7) represents OAM mode generation and separation processes which are processes corresponding to discrete Fourier transform and inverse transform.

Next, when L is set to min($N_{RX}, N_{TX}$), a channel response Λ including the OAM mode generation and separation processes is formed as in Equation (8).

$$\Lambda = \begin{bmatrix} H_{l(1),l(1)} & \cdots & H_{l(1),l(L)} \\ \vdots & \ddots & \vdots \\ H_{l(L),l(1)} & \cdots & H_{l(L),l(L)} \end{bmatrix} \quad (8)$$

Here, $H_{l(x),l(y)}$ is a channel between OAM modes l(x) and l(y), and is represented as in Equation (9).

$$H_{l(x),l(y)} = \begin{bmatrix} \sum_{1,1}(x,y) & \cdots & \sum_{1,M_{TX}}(x,y) \\ \vdots & \ddots & \vdots \\ \sum_{M_{RX},1}(x,y) & \cdots & \sum_{M_{RX},M_{TX}}(x,y) \end{bmatrix} \quad (9)$$

$$(x, y = 1, 2, \ldots, L)$$

$$l(k) = k - (\lceil N/2 \rceil + 1)$$

Singular value decomposition is performed on the channel response Λ obtained in the above-described way as represented in Equation (10), weight multiplication processes are performed by using a corresponding left singular vector as a transmitting weight in the transmitting station and by using a corresponding right singular vector as a receiving weight in the receiving station as represented in Equation (11), and thus P independent propagation paths can be secured for each of L OAM modes when P is set to min($M_{RX}, M_{TX}$).

$$\Lambda = U\Sigma'V^H \quad (10)$$

$$\sum{'}(x, y) = \begin{Bmatrix} \sqrt{\lambda_x} & (x=y) \\ 0 & (x \neq y) \end{Bmatrix}$$

$$(x = 1, 2, \ldots, L \times M_{RX}, y = 1, 2, \ldots, L \times M_{TX})$$

$$\sum{'} = U^H \Lambda V \quad (11)$$

Here, when the number of OAM modes to be actually used is indicated by Luse (≤L), the element $H_{l(x),l(y)}$ in Equation (9) is restricted to a combination of OAM modes to be actually used. Therefore, the OAM mode generation and separation processes such as $N_{TX}$ L-point discrete Fourier transform in the transmitting station and $N_{RX}$ L-point discrete Fourier transform in the receiving station, and a singular value decomposition process on an (Luse×$M_{RX}$)× (Luse×$M_{TX}$) matrix may be performed, and thus a calculation amount can be reduced compared with the MIMO of the related art except for a case of Luse×$M_{RX}=\Sigma_n M_{RX}(m)$, and Luse×$M_{TX}=\Sigma_m M_{TX}(n)$.

When the OAM mode generation and separation processes are performed by using an analog circuit such as a Butler matrix, it is possible to easily reduce the number of devices such as mixers, DA converters, and AD converters by restricting the number of OAM modes to be used unlike the MIMO of the related art in which devices such as mixers, DA converters, and AD converters of the number proportional to the number of antennae are necessarily used.

The number of complex modes obtained from all of the channels is a maximum of L×P.

Among the complex modes, any complex mode to be used may be set according to a magnitude of an eigenvalue obtained in an installation environment supposed in advance or a necessary parallel number.

The process procedures in the OAM multiplexing communication method illustrated in FIG. 3 are executed when data to be transmitted to the transmitting station arrives. Weight calculation using a singular value decomposition process may not be performed between equivalent propagation channels, and a past value may be used as a weight to be multiplied.

Hereinafter, a specific example will be described.

Transmitting and receiving antennae are an M-UCA having parameters indicated in Table 1, and the transmitting and receiving antennae are disposed to face each other such that a propagation axis is perpendicular to an antenna surface and passes through centers of all UCAs. Here, for simplification, the parameters in Table 1 are common to the transmitting and receiving antennae.

TABLE 1

| | |
|---|---|
| Number of UCAs of antenna ($M_{TX}$, $M_{RX}$) | 4 |
| Number of antenna elements of UCA ($N_{TX}$, $N_{RX}$) | 16, 16, 16, 16 |
| Diameter of UCA [m] | 0.1, 0.2, 0.3, 0.4 |
| Frequency band [GHz] | 28 |
| Distance between transmitting and receiving antennae [m] | 10 |

OAM modes used in the present example are five modes such as −2, −1, 0, 1, and 2. In this method, first, as preparation, in order to determine weight vectors to be multiplied in weight multiplication processes in the transmitting and receiving stations, the OAM mode generation and separation processes represented in Equation (5) are performed on channels (Equation (4)) formed as a result of the M-UCAs being disposed to face each other in the transmitting and receiving stations, and thus the equivalent channel matrix Λ (20×20) represented in Equation (8) is required.

Next, the matrix is subjected to singular value decomposition as represented in Equation (10) such that left and right singular matrixes (20×20 matrix) are obtained, and then the right singular matrix is fed back to the transmitting station.

Next, a transmission signal sequence is divided (S/P conversion) into signals corresponding to the number of complex modes for multiplexing, and each signal is modulated. Multiplication of a weight of the right singular matrix obtained through the preprocess and an OAM mode generation process are performed on the modulated signals which are converted into analog signals by DACs based on the process procedures illustrated in FIG. 3, and then power is supplied to each antenna element.

In the receiving station, a signal received by each antenna element is converted into a digital signal by an ADC, and is then subjected to an OAM mode separation process and multiplication of a weight of the left singular matrix obtained through the preprocess based on the process procedures illustrated in FIG. 3. An obtained signal is demodulated, and the signals divided on the transmission side for the complex modes are combined with each other (P/S conversion), and thus a received signal sequence is obtained.

In the present example, for example, when a multi-carrier transmission method such as an OFDM method is used, a time or frequency direction dimension may be expanded and a process may be performed according to a transmission method to be used, for example, by performing channel estimation and singular value decomposition for each subcarrier according to the present example.

When there is deviation from a front facing state of transmitting and receiving antenna positions, or interference due to a signal from another system, multi-paths and the like, it is preferable that a weight obtained by using an equalization algorithm such as a minimum mean square error (MMSE) algorithm or a zero forcing (ZF) algorithm instead of a left singular matrix is used as an equalization weight, and thus an appropriate equalization process is performed.

Example 2

Figure 4:
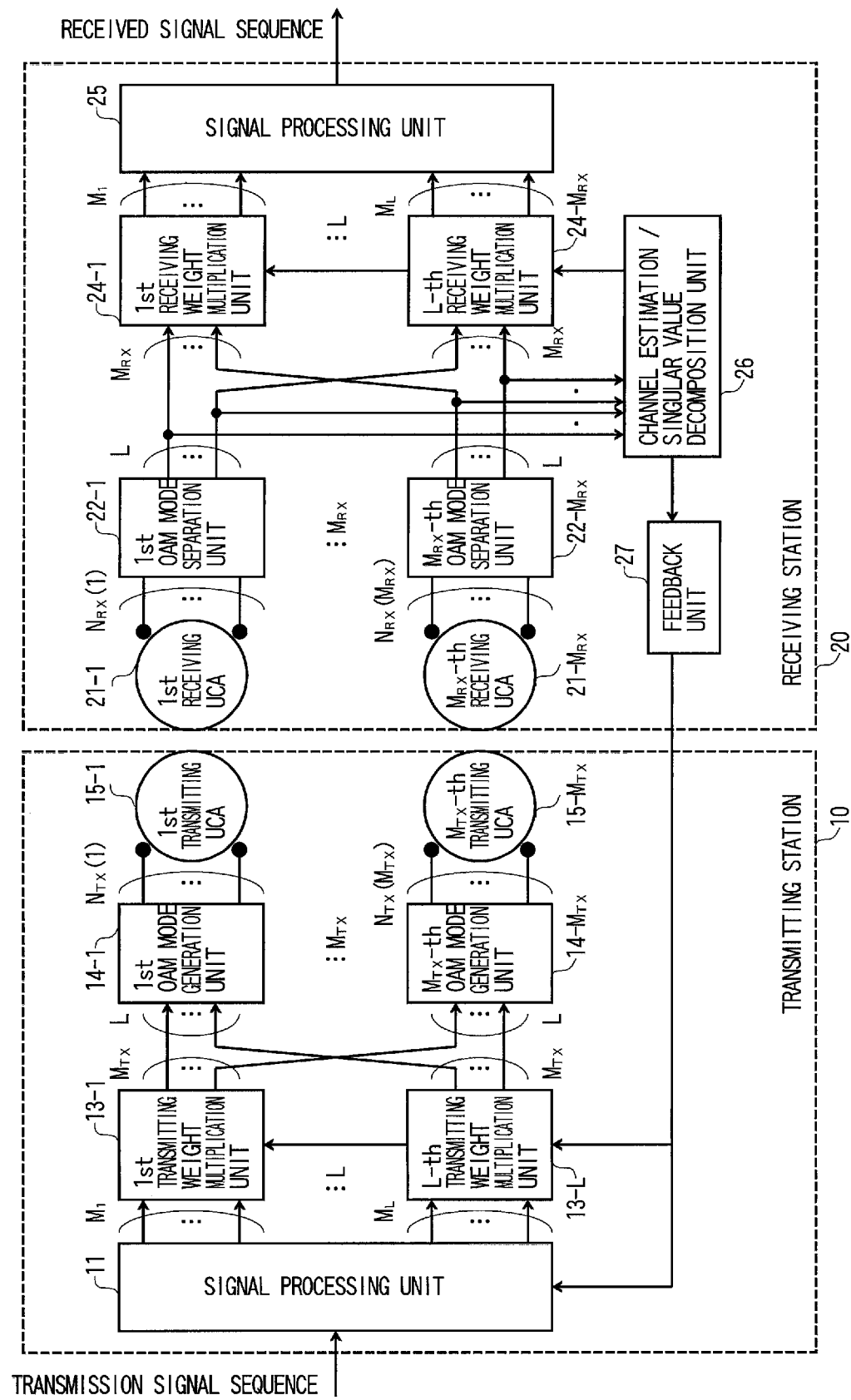
FIG. 4 is a diagram illustrating a configuration of Example 2 of an OAM multiplexing communication system of the present invention.

FIG. 4 is a diagram illustrating a configuration of Example 2 of an OAM multiplexing communication system of the present invention.

In FIG. 4, the transmitting station 10 includes a plurality of $M_{TX}$ UCAs such as the first UCA 15-1 to the $M_{TX}$-th UCA 15-$M_{TX}$, and the number of transmitting antenna elements of each thereof is $N_{TX}(1)$ to $N_{TX}(M_{TX})$. The signal processing unit 11 receives a transmission signal sequence, generates $M_1$ to $M_L$ signals respectively transmitted in OAM modes #1 to #L, and inputs the signals to a first transmitting weight multiplication unit 13-1 to an L-th transmitting weight multiplication unit 13-L, respectively. The first transmitting weight multiplication unit 13-1 multiplies the signal transmitted in the OAM mode #1 by a transmitting weight so as to generate a signal to be transmitted in the OAM mode #1 from each UCA, and inputs signals to the first OAM mode generation unit 14-1 to the $M_{TX}$-th OAM mode generation unit 14-$M_{TX}$, respectively. Similarly, the L-th transmitting weight multiplication unit 13-L multiplies the signal transmitted in the OAM mode #L by a transmitting weight so as to generate a signal to be transmitted in the OAM mode #L from each UCA, and inputs signals to the first OAM mode generation unit 14-1 to the $M_{TX}$-th OAM mode generation unit 14-$M_{TX}$, respectively. Each of the first OAM mode generation unit 14-1 to the $M_{TX}$-th OAM mode generation unit 14-$M_{TX}$ receives the signals to be transmitted in the OAM modes #1 to #L from each UCA, adjusts phases of the signals to be transmitted as signals in the OAM modes #1 to #L, and inputs the signals to the antenna elements of each UCA.

The receiving station 20 includes a plurality of $M_{RX}$ UCAs such as the first UCA 21-1 to the $M_{RX}$-th UCA 21-$M_{RX}$, and the number of receiving antenna elements of each thereof is $N_{RX}(1)$ to $N_{RX}(M_{RX})$. Each of the first OAM mode separation unit 22-1 to the $M_{RX}$ OAM mode separation unit 22-$M_{RX}$ separates signals in the OAM modes #1 to #L from signals received in each of the UCAs, and inputs the signals to a first receiving weight multiplication unit 24-1 to an L-th receiving weight multiplication unit 24-$M_L$ for the respective OAM modes. The first receiving weight multiplication unit 24-1 receives the signals in the OAM mode #1 received in the respective UCAs, and multiplies the signals by a receiving weight so as to separate the signals, and outputs the signals as $M_1$ signals. Similarly, the L-th receiving weight multiplication unit 24-$M_L$ receives the signals in the OAM mode #L received in the respective UCAs, and multiplies the signals by a receiving weight so as to separate the signals, and outputs the signals as $M_L$ signals. The signal processing unit 25 demodulates the signal received in each UCA and each OAM mode, and outputs a received signal sequence.

The receiving station 20 includes the channel estimation/singular value decomposition unit 26 that estimates channel information of each signal sequence by using output signals from the first OAM mode separation unit 22-1 to the $M_{RX}$-th OAM mode separation unit 22-$M_{RX}$. The channel estimation/singular value decomposition unit 26 sets the estimated channel information in the first receiving weight multiplication unit 24-1 to the L-th receiving weight multiplication unit 24-$M_L$, sets the estimated channel information in a first transmitting weight multiplication unit 13-1 to L-th transmitting weight multiplication unit 13-$M_L$ of the transmitting station 10 via the channel information feedback unit 27, and also sets multiplex numbers $M_1$ to $M_L$ for each OAM mode in the signal processing unit 11.

The feature of Example 2 is that a transmitting weight multiplication process and a receiving weight multiplication process are performed in parallel for each OAM mode.

Since, in the OAM mode generation unit and the OAM mode separation unit, signals in different OAM modes are generated and separated, among the channels $H_{I(x),I(y)}$ between OAM modes forming the equivalent channel Λ including the OAM mode generation and separation processes represented in Equation (8), channels between different OAM modes (x≠y) may be approximated to a 0 matrix, and thus a block diagonal matrix as in Equation (12) is obtained.

$$\Lambda = \begin{bmatrix} H_{l(1),l(1)} & \cdots & 0 \\ \vdots & \ddots & \vdots \\ 0 & \cdots & H_{l(L),l(L)} \end{bmatrix} \quad (12)$$

Here, when channels between identical OAM modes (x=y) are redefined as $H_{l(k)}=H_{l(k),l(k)}$ (where k=1, 2, . . . , and L), singular value decomposition is performed on L independent channel responses $H_{l(k)}$ as in Equation (13), weight multiplication processes using a left singular vector and a right singular vector respectively corresponding to as weights performed in the transmitting station and the receiving station as represented in Equation (14), and thus P independent propagation paths can be secured for each of L OAM modes when P is set to min[$M_{RX}$,$M_{TX}$].

$$H_{l(k)} = U_{l(k)} \sum_{l(k)}' V_{l(k)}^H \quad (13)$$

$$\sum_{l}' (x, y) = \begin{cases} \sqrt{\lambda_{l,x}} & (x = y) \\ 0 & (x \neq y) \end{cases}$$

$(x = 1, 2, \ldots, M_{RX}, y = 1, 2, \ldots, M_{TX})$ $$\sum_{l}' = U_l^H H_l V_l \quad (14)$$

Here, when the number of OAM modes to be actually used is indicated by Luse (≤L), the OAM mode generation and separation processes such as $N_{TX}$ L-point discrete Fourier transform in the transmitting station and $N_{RX}$ L-point discrete Fourier transform in the receiving station, and a singular value decomposition process on an ($M_{RX}×M_{TX}$) matrix may be performed Luse times, and thus a calculation amount can be considerably reduced compared with the MIMO of the related art or Example 1.

When the OAM mode generation and separation processes are performed by using an analog circuit such as a Butler matrix, it is possible to easily reduce the number of devices such as mixers, DA converters, and AD converters by restricting the number of OAM modes to be used unlike the MIMO of the related art in which devices such as mixers, DA converters, and AD converters of the number proportional to the number of antennae are necessarily used.

The number of complex modes obtained from all of the channels is a maximum of L×P.

Among the complex modes, any complex mode to be used may be set according to a magnitude of an eigenvalue obtained in an installation environment supposed in advance or a necessary parallel number.

The process procedures in the OAM multiplexing communication method illustrated in FIG. 3 are executed when data to be transmitted to the transmitting station arrives. Weight calculation using a singular value decomposition process may not be performed between equivalent propagation channels, and a past value may be used as a weight to be multiplied.

In the same manner as in Example 1, transmitting and receiving antennae are an M-UCA having parameters indicated in Table 1, and the transmitting and receiving antennae are disposed to face each other such that a propagation axis is perpendicular to an antenna surface and passes through centers of all UCAs. Here, for simplification, the parameters in Table 1 are common to the transmitting and receiving antennae.

OAM modes used in the present example are sixteen modes such as −8, −7, . . . , 6, and 7. In this method, first, as preparation, in order to determine weight vectors to be multiplied in weight multiplication processes in the transmitting and receiving stations, the OAM mode generation and separation processes represented in Equation (5) are performed on channels (Equation (4)) formed as a result of the M-UCAs being disposed to face each other in the transmitting and receiving stations, and thus a channel matrix $H_l$(4×4) between identical OAM modes l is acquired among channels between OAM modes represented in Equation (9).

Next, the matrix is subjected to singular value decomposition as represented in Equation (13) such that left and right singular matrixes (sixteen 4×4 matrixes) are obtained, and then the right singular matrix is fed back to the transmitting station. Table 2 indicates eigenvalues corresponding to combinations of rotational direction and diameter direction dimensions when antennae are provided according to the parameters in Table 1.

TABLE 2

| Eigenvalue | | Mode in diameter direction dimension | | | |
|---|---|---|---|---|---|
| | | 1 | 2 | 3 | 4 |
| Mode in rotational direction dimension (OAM mode) | 0 | 4.27 E-03 | 8.09 E-04 | 2.31 E-05 | 1.21 E-07 |
| | 1,-1 | 2.11 E-03 | 1.86 E-04 | 2.63 E-06 | 6.92 E-09 |
| | 2,-2 | 9.23 E-04 | 3.12 E-05 | 2.04 E-07 | 1.75 E-10 |
| | 3,-3 | 3.25 E-04 | 4.52 E-06 | 1.32 E-08 | 2.53 E-12 |
| | 4,-4 | 9.18 E-05 | 5.64 E-07 | 6.97 E-10 | 2.74 E-14 |
| | 5,-5 | 2.13 E-05 | 6.09 E-08 | 3.04 E-11 | 3.61 E-16 |
| | 6,-6 | 4.19 E-06 | 5.69 E-09 | 1.16 E-12 | 1.18 E-16 |
| | 7,-7 | 6.93 E-07 | 5.27 E-10 | 4.50 E-14 | 3.35 E-16 |
| | 8 | 2.09 E-07 | 6.93 E-11 | 2.23 E-15 | 2.37 E-16 |

TABLE 3

| Power ratio | | Mode in diameter direction dimension | | | |
|---|---|---|---|---|---|
| | | 1 | 2 | 3 | 4 |
| Mode in rotational direction dimension (OAM mode) | 0 | 1.000 | 1.000 | 0.989 | 0 |
| | 1,-1 | 1.000 | 0.999 | 0.905 | 0 |
| | 2,-2 | 1.000 | 0.992 | 0 | 0 |
| | 3,-3 | 0.999 | 0.945 | 0 | 0 |
| | 4,-4 | 0.997 | 0.558 | 0 | 0 |
| | 5,-5 | 0.988 | 0 | 0 | 0 |
| | 6,-6 | 0.941 | 0 | 0 | 0 |
| | 7,-7 | 0.641 | 0 | 0 | 0 |
| | 8 | 0 | 0 | 0 | 0 |

Next, a transmission signal sequence is divided (S/P conversion) into signals corresponding to the number of complex modes for multiplexing, and each signal is modulated. Multiplication of a weight of the right singular matrix obtained through the preprocess and an OAM mode generation process are performed on the modulated signals which are converted into analog signals by DACs based on the process procedures illustrated in FIG. 3, and then power is supplied to each antenna element.

In the receiving station, a signal received by each antenna element is converted into a digital signal by an ADC, and is then subjected to an OAM mode separation process and multiplication of a weight of the left singular matrix obtained through the preprocess based on the process procedures illustrated in FIG. 3. An obtained signal is demodulated, and the signals divided on the transmission side are combined with each other (P/S conversion), with respect to the complex modes and thus a received signal sequence is obtained.

In the present example, for example, when a multi-carrier transmission method such as an OFDM method is used, a time or frequency direction dimension may be expanded and a process may be performed according to a transmission method to be used, for example, by performing channel estimation and singular value decomposition for each subcarrier according to the present example.

When there is deviation from a front facing state of transmitting and receiving antenna positions, or interference due to a signal from another system and multi-paths and the like, it is preferable that a weight obtained by using an equalization algorithm such as a minimum mean square error (MMSE) algorithm or a zero forcing (ZF) algorithm instead of a left singular matrix is used as an equalization weight, and thus an appropriate equalization process is performed.

Example 3

In Example 3, when a transmission signal sequence is modulated through S/P conversion, a complex mode to be used or power allocated thereto is controlled according to, for example, a water filling principle by using an eigenvalue in a complex mode, and adaptive modulation or channel encoding is also performed.

Table 3 indicates power when a complex mode is selected and power is distributed according to the water filling principle. Power when a combination of modes of rotational direction and diameter direction dimensions is [0,0] is normalized to 1. Table 3 indicates that complex modes in a solid frame in the table are used when transmitting and receiving antennae are provided according to the parameters in Table 1, and the water filling principle is applied.

Since reception power to be allocated to each used complex mode is obtained from Table 2 and Table 3, the transmitting and receiving antennae adaptively select a modulation method or an encoding method according to a reception SNR for each mode by taking into consideration superimposed noise, and thus it is possible to secure higher transmission capacity than in Example 1.

Example 4

In Example 4, a usage complex mode corresponding to a distance between antennae or weights to be multiplied in transmitting and receiving stations, and a table or a function for power allocation are prepared in advance.

When an antenna configuration is uniquely defined, a channel between antennae and an eigenvalue thereof is uniquely defined according to a distance between the antennae. In other words, in Example 4, estimation and feedback of channel information are not necessary, and information regarding a distance between antennae is acquired, and thus a usage complex mode and power allocation can be determined based on the table or the function prepared in advance.

Example 5

Figure 5:
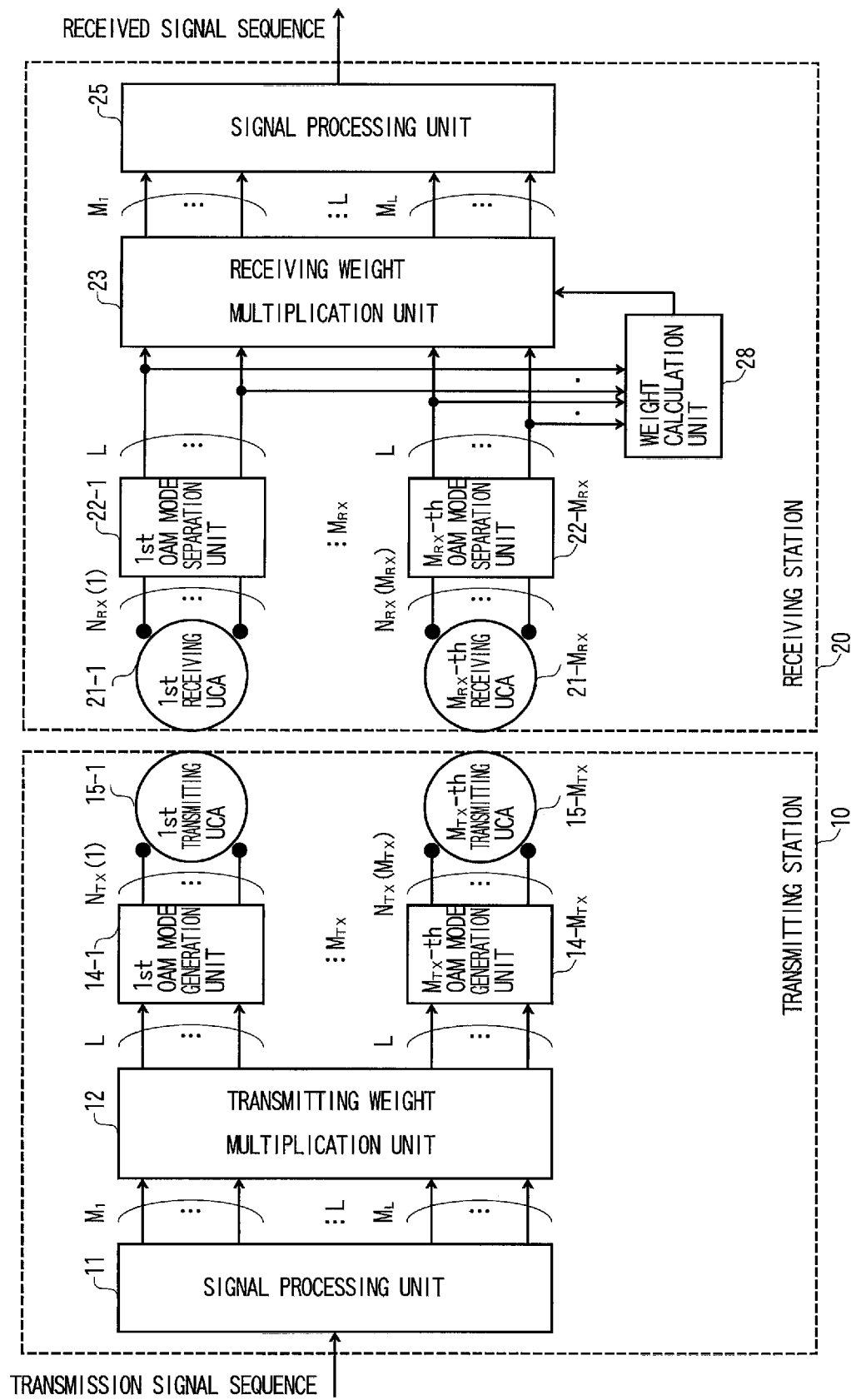
FIG. 5 is a diagram illustrating a configuration of Example 5 of an OAM multiplexing communication system of the present invention.

FIG. 5 is a diagram illustrating a configuration of Example 5 of an OAM multiplexing communication system of the present invention.

In FIG. 5, a weight calculation unit 28 is provided in Example 5 instead of the channel estimation/singular value decomposition unit 26 and the feedback unit 27 of the receiving station 20 of Example 1 illustrated in FIG. 2. The weight calculation unit 28 performs channel estimation and weight calculation by using output signals from the first OAM mode separation unit 22-1 to the $M_{RX}$-th OAM mode separation unit 22-$M_{RX}$, and sets a calculated weight in the receiving weight multiplication unit 23.

Figure 6:
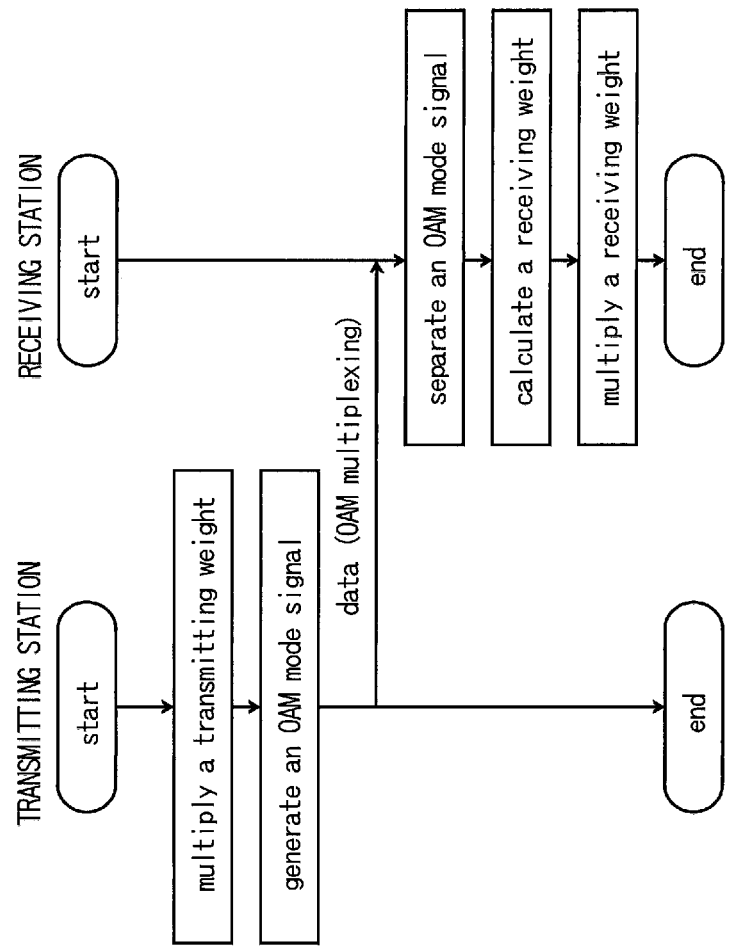
FIG. 6 is a diagram illustrating examples of process procedures of an OAM multiplexing communication method in Example 5.

FIG. 6 illustrates examples of process procedures of an OAM multiplexing communication method in Example 5.

In FIG. 6, the transmitting station 10 determines a multiplex number and a transmission mode by using predetermined channel information, performs a weight multiplication process so as to generate an OAM mode signal, and subjects the signal to OAM multiplexing transmission. The receiving station 20 performs a separation process on the received OAM mode signal, performs channel estimation and weight calculation, performs a weight multiplication process, and outputs an obtained signal as a received signal.

An operation principle in Example 5 is fundamentally the same as the operation principle in Example 1, but the channel response Λ obtained according to Equation (8) is multiplied by a transmitting weight matrix V formed of predefined transmitting weight vectors, and thus a signal as in the following Equation (15) is obtained.

$$y = \Lambda V s \quad (15)$$

Here, s is a signal vector. Finally, an equalization process is performed on the obtained received signal vector y by using a predefined receiving weight matrix U, or a receiving weight matrix U obtained by using an equalization algorithm such as a minimum mean square error (MMSE) algorithm or a zero forcing (ZF) algorithm, and thus P independent propagation paths can be secured for each of L OAM modes when P is set to $\min[M_{RX}, M_{TX}]$, and a signal as in Equation (16) is obtained.

$$r = U^H y = U^H \Lambda V s \quad (16)$$

in case of MMSE algorithm (σ: variance of noise):

$$U = (\Lambda V V^H \Lambda^H + \sigma^2 I)^{-1} \Lambda V$$

in case of ZF algorithm:

$$U = (\Lambda V V^H \Lambda^H)^{-1} \Lambda V$$

Here, when the number of OAM modes to be actually used is indicated by Luse (≤L), the element $H_{l(x),l(y)}$ in Equation (9) is restricted to a combination of OAM modes to be actually used. Therefore, the OAM mode generation and separation processes such as $N_{TX}$ L-point discrete Fourier transform in the transmitting station and $N_{RX}$ L-point discrete Fourier transform in the receiving station, and an equalization process on an (Luse×$M_{RX}$)×(Luse×$M_{TX}$) matrix when transmitting and receiving weights are not defined in advance may be performed, and thus a calculation amount can be reduced compared with the MIMO of the related art.

When the OAM mode generation and separation processes are performed by using an analog circuit such as a Butler matrix, it is possible to easily reduce the number of devices such as mixers, DA converters, and AD converters by restricting the number of OAM modes to be used unlike the MIMO of the related art in which devices such as mixers, DA converters, and AD converters of the number proportional to the number of antennae are necessarily used.

The number of complex modes obtained from all of the channels is a maximum of L×P.

Among the complex modes, any complex mode to be used may be set according to a magnitude of an eigenvalue obtained in an installation environment supposed in advance or a necessary parallel number.

The process procedures in the OAM multiplexing communication method illustrated in FIG. 6 are executed when data to be transmitted to the transmitting station arrives. Weight calculation may not be performed between equivalent propagation channels, and a past value to be multiplied may be used as a weight.

Hereinafter, a specific example will be described.

Transmitting and receiving antennae are an M-UCA having parameters indicated in Table 1, and the transmitting and receiving antennae are disposed to face each other such that a propagation axis is perpendicular to an antenna surface and passes through centers of all UCAs.

OAM modes used in the present example are five modes such as −2, −1, 0, 1, and 2. A unit matrix represented in Equation (17) is used as a transmitting weight matrix used in this method.

$$V = \begin{pmatrix} 1 & & & 0 \\ & 1 & & \\ & & \ddots & \\ 0 & & & 1 \end{pmatrix} \quad (17)$$

This corresponds to respectively and separately inputting 4×5 signals to ports corresponding to OAM modes used by four OAM mode generation units.

This is equivalent to a configuration in which the transmitting weight multiplication unit 12 illustrated in FIG. 5 is omitted, and a signal may be directly input to the OAM mode generation unit from the signal processing unit 11.

First, in the transmitting station, a transmission signal sequence is divided (S/P conversion) into signals corresponding to the number of complex modes for multiplexing, and each signal is modulated. A known signal sequence that is shared by the transmitting and receiving stations in advance is given ahead of each signal. Weight Multiplication represented in Equation (12) and an OAM mode generation process are performed on the modulated signals which are converted into analog signals by DA converters, and then power is supplied to each antenna element.

In the receiving station, a signal received by each antenna element is converted into a digital signal by an AD converter, and is then subjected to an OAM mode separation process, and the received signal y is multiplied by the receiving weight matrix U calculated according to the MMSE algorithm. An obtained signal is demodulated, and the signals divided on the transmission side are combined with each other (P/S conversion) with respect to the complex modes, and thus a received signal sequence is obtained.

Example 6

Figure 7:
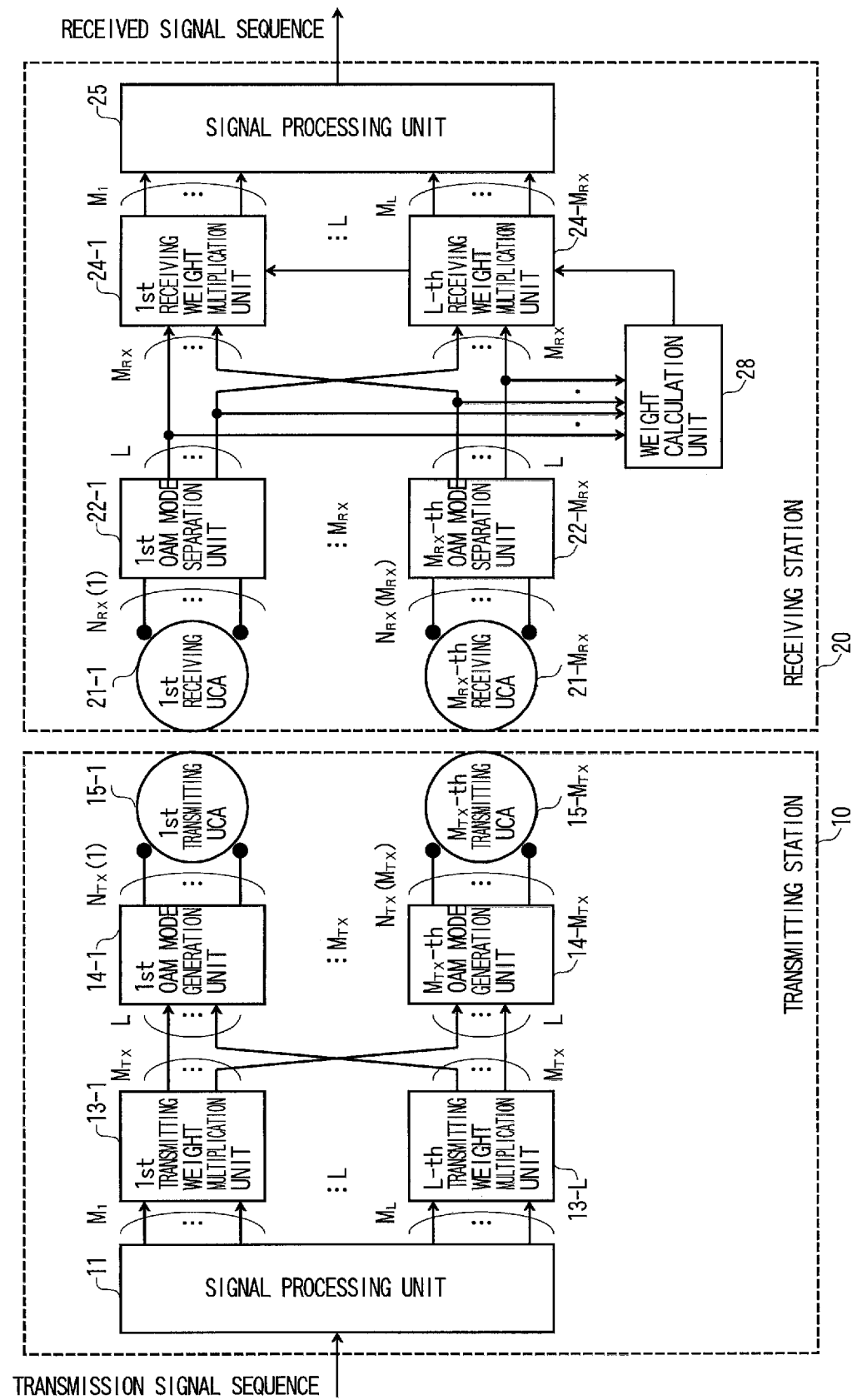
FIG. 7 is a diagram illustrating a configuration of Example 6 of an OAM multiplexing communication system of the present invention.

FIG. 7 is a diagram illustrating a configuration of Example 6 of an OAM multiplexing communication system of the present invention.

In FIG. 7, the weight calculation unit 28 is provided in Example 6 instead of the channel estimation/singular value decomposition unit 26 and the flexure 27 of the receiving station 20 of Example 2 illustrated in FIG. 4. The weight calculation unit 28 performs channel estimation and weight calculation by using output signals from the first OAM mode separation unit 22-1 to the $M_{RX}$-th OAM mode separation unit 22-$M_{RX}$, and sets a calculated weight in the receiving weight multiplication unit 23.

Since, in the OAM mode generation unit and the OAM mode separation unit, signals in different OAM modes are generated and separated, among the channels $H_{l(x),l(y)}$ between OAM modes forming the equivalent channel Λ including the OAM mode generation and separation processes represented in Equation (8), channels between different OAM modes (x≠y) may be approximated to a 0 matrix, and thus a block diagonal matrix as in Equation (18) is obtained.

$$\Lambda = \begin{bmatrix} H_{l(1),l(1)} & \cdots & 0 \\ \vdots & \ddots & \vdots \\ 0 & \cdots & H_{l(L),l(L)} \end{bmatrix} \quad (18)$$

Here, when channels between identical OAM modes (x=y) are redefined as $H_{l(k)} = H_{l(k),l(k)}$ (where k=1, 2, ..., and L), with respect to L independent channel responses $H_{l(k)}$, a transmitting weight matrix $V_l$ formed of transmitting weight vectors in advance is multiplied by P (P=min[$M_{RX}, M_{TX}$]) signals, and thus a signal as in Equation (19) is obtained for each OAM mode l.

$$y_l = H_l V_l s_l \quad (19)$$

Here, $s_l$ is a signal vector. Finally, in the same manner as in Example 1, an equalization process is performed on the obtained received signal vector $y_l$ by using a predefined receiving weight matrix U, or a receiving weight matrix U obtained by using an equalization algorithm such as a minimum mean square error (MMSE) algorithm or a zero forcing (ZF) algorithm, and thus P independent propagation paths can be obtained, and a signal as in Equation (20) is obtained.

$$r_l = U_l y_l = U_l^H H_l V_l s_l \quad (20)$$

Here, when the number of OAM modes to be actually used is indicated by Luse ($\leq$L), the element $H_{l(x),l(y)}$ in Equation (9) is restricted to a combination of OAM modes to be actually used. Therefore, the OAM mode generation and separation processes such as $N_{TX}$ L-point discrete Fourier transform in the transmitting station and $N_{RX}$ L-point discrete Fourier transform in the receiving station, and an equalization process on an $N_{RX} \times N_{TX}$ matrix may be performed Luse times when transmitting and receiving weights are not defined in advance, and thus a calculation amount can be considerably reduced compared with the MIMO of the related art or Example 1.

When the OAM mode generation and separation processes are performed by using an analog circuit such as a Butler matrix, it is possible to easily reduce the number of devices such as mixers, DA converters and AD converters by restricting the number of OAM modes to be used unlike the MIMO of the related art in which devices such as mixers, DA converters, and AD converters of the number proportional to the number of antennae are necessarily used.

The number of complex modes obtained from all of the channels is a maximum of L×P.

Among the complex modes, any complex mode to be used may be set according to a magnitude of an eigenvalue obtained in an installation environment supposed in advance or a necessary parallel number.

The process procedures in the OAM multiplexing communication method illustrated in FIG. 6 are executed when data to be transmitted to the transmitting station arrives. Weight calculation may not be performed between equivalent propagation channels, and a past value to be multiplied may be used as a weight.

In the same manner as in Example 5, transmitting and receiving antennae are an M-UCA having parameters indicated in Table 1, and the transmitting and receiving antennae are disposed to face each other such that a propagation axis is perpendicular to an antenna surface and passes through centers of all UCAs. Here, for simplification, the parameters in Table 1 are common to the transmitting and receiving antennae.

OAM modes used in the present example are five modes such as −2, −1, 0, 1, and 2. A unit matrix represented in Equation (21) is used as a transmitting weight matrix used in this method.

$$V_l = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (21)$$

This corresponds to respectively and separately inputting four signals to ports corresponding to OAM modes used by four OAM mode generation units corresponding to respective UCAs.

This is equivalent to a configuration in which the first transmitting weight multiplication unit 13-1 to the L-th transmitting weight multiplication unit 13-L illustrated in FIG. 7 are omitted, and signals may be directly input to the first OAM mode generation unit 14-1 to $M_{TX}$-th OAM mode generation unit 14-$M_{TX}$ from the signal processing unit 11.

First, in the transmitting station, a transmission signal sequence is divided (S/P conversion) into signals corresponding to the number of complex modes for multiplexing, and each signal is modulated. A known signal sequence that is shared by the transmitting and receiving stations in advance is given ahead of each signal. Weight Multiplication represented in Equation (21) and an OAM mode generation process are performed on the modulated signals which are converted into analog signals by DACs, and then power is supplied to each antenna element.

In the receiving station, a signal received by each antenna element is converted into a digital signal by an ADC, and is then subjected to an OAM mode separation process, and the signal $y_l$ received for each identical OAM mode is multiplied by the receiving weight matrix U calculated according to the MMSE algorithm. An obtained signal is demodulated, and the signals divided on the transmission side with respect to the complex modes are combined with each other (P/S conversion), and thus a received signal sequence is obtained.

Example 7

In Example 7, a transmitting weight vector and a receiving weight vector orthogonal to each other are determined based on a distance between transmitting and receiving antennae and a Gaussian function.

First, the transmitting station acquires information regarding a distance between the transmitting and receiving antennae by using a laser range finder or other distance estimation methods. When a distance between the transmitting and receiving antennae is indicated by z, weight matrixes $V_l$ and $U_l$ formed of transmitting weight vectors and receiving weight vectors may be represented as in Equation (22).

$$V_l = \begin{pmatrix} u_{1,l}(r_l, -z_0) & \cdots & u_{1,l}(r_P, -z_0) \\ \vdots & \ddots & \vdots \\ u_{P,l}(r_1, -z_0) & \cdots & u_{P,l}(r_P, -z_0) \end{pmatrix} \quad (22)$$

$$U_l = \begin{pmatrix} u_{1,l}(r_l, z-z_0) & \cdots & u_{1,l}(r_P, z-z_0) \\ \vdots & \ddots & \vdots \\ u_{P,l}(r_1, z-z_0) & \cdots & u_{P,l}(r_P, z-z_0) \end{pmatrix}$$

here, $$u_{p,l}(r,z) = \left(\frac{\sqrt{2}\, r}{\omega(z)}\right)^{|l|} L_{|l|}^p \left[\frac{2r^2}{\omega^2(z)}\right] \exp\left[-\frac{r^2}{\omega^2(z)}\right] \cdot \exp\left[i\frac{kr^2}{2R(z)}\right] \cdot \Phi$$

$$\Phi = \exp\left[-i(1+2p+|l|)\tan^{-1}\left(\frac{z}{z_R}\right)\right]$$

$$\omega(z) = \omega_0 \sqrt{1+\left(\frac{z}{z_R}\right)^2}, \; R(z) = \frac{z_R^2 + z^2}{z}, \; z_R = \frac{k\omega_0^2}{2}, \; k = \frac{2\pi}{\lambda}$$

$L^p_{|l|}$ is an associated Laguerre polynomial when p is an integer of 0 or greater, and l is an integer.

In addition, $\omega_0$ is a value indicating a beam weight diameter of a Gaussian beam, and $z_0$ is a value indicating an offset of a beam weight position of the Gaussian beam, and any values may be set according to an antenna installation environment.

There may be a configuration in which a calculation process is omitted by preparing a table in which weight matrixes corresponding to distances having discrete values are calculated in advance, and a weight matrix closest to an actual distance is selected and used.

Example 8

In Example 8, when a transmission signal sequence is modulated through S/P conversion, a complex mode to be used or power allocated thereto is controlled according to a water filling principle by using an eigenvalue in a complex mode, and adaptive modulation or channel encoding is also performed.

When a predetermined function or table is used as in Example 7, an eigenvalue for each mode corresponding to a distance between antennae can be computed and prepared in advance. In this case, since reception power to be allocated to each used complex mode is obtained by using, for example, a water filling principle, the transmitting and receiving antennae adaptively select a modulation method or an encoding method according to a reception SNR for each mode by taking into consideration superimposed noise, and thus it is possible to secure higher transmission capacity than in Examples 5 to 7. This may be successively and adaptively performed by feeding back communication quality information during communication.

Example 9

In Example 9, functions corresponding to digital signal processing and signal processing using an analog circuit are distributed.

In Example 9, in OAM mode generation and separation processes, a Butler matrix, a Rotman lens, and an analog circuit similar thereto are used. In Example 9, the number of antenna elements of each UCA of transmitting and receiving antennae is eight.

Figure 8:
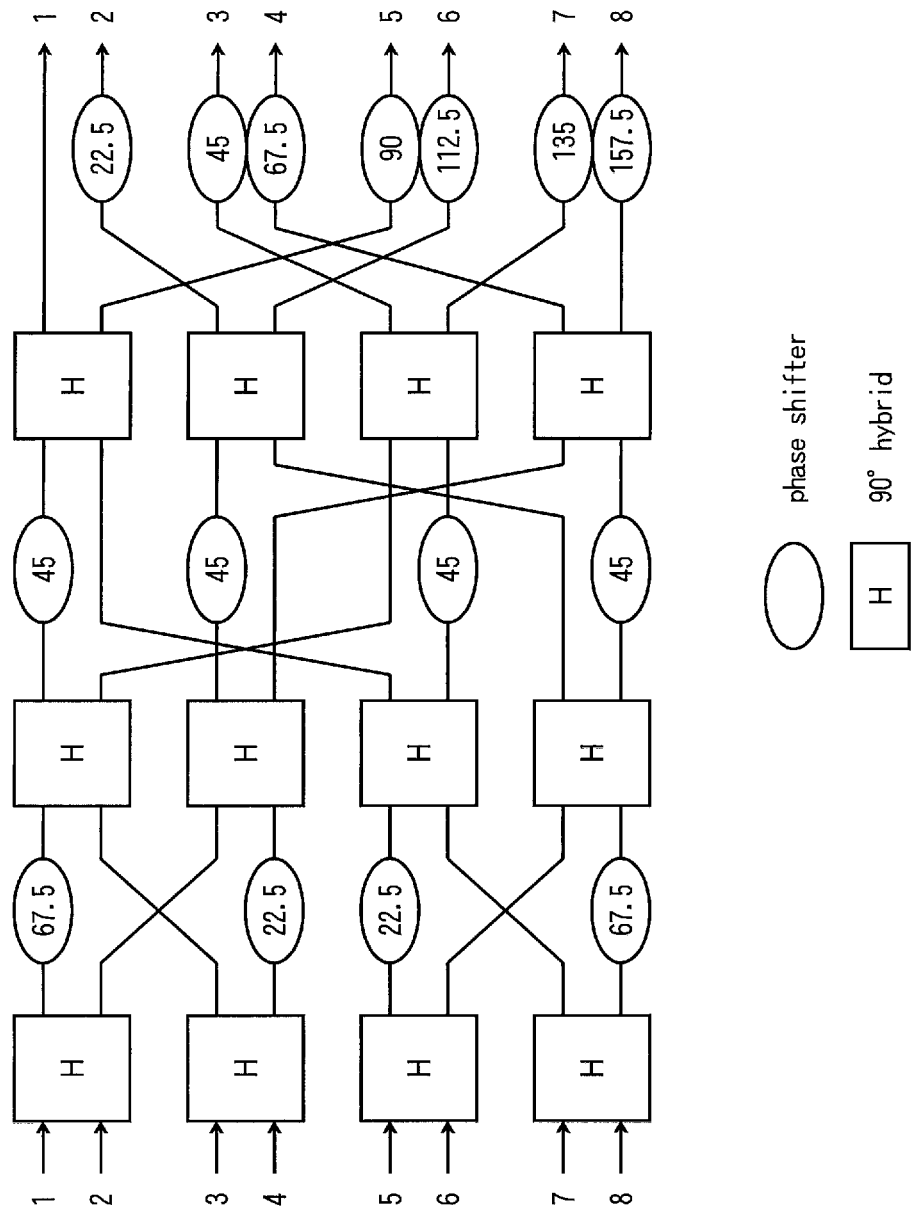
FIG. 8 is a diagram illustrating an example of an 8×8 Butler matrix.

FIG. 8 illustrates an example of an 8×8 Butler matrix.

In FIG. 8, the 8×8 Butler matrix is formed of 90-degree hybrids and phase shifters indicated by numerical values. As mentioned above, a part of the digital signal processing is performed by the analog circuit, and thus a digital signal processing load can be further reduced.

Higher OAM modes may not be used when all OAM modes cannot be used or are not necessarily required to be used, for example, in an installation environment in which a sufficient eigenvalue cannot be obtained. For example, even in a case of Table 3, the OAM mode 8 is not used.

In such a case, in analog circuits of the transmitting and receiving stations, an input port corresponding to an OAM mode that is not used is terminated from the beginning, and thus the number of AD converters and DA converters can be reduced.

Figure 9:
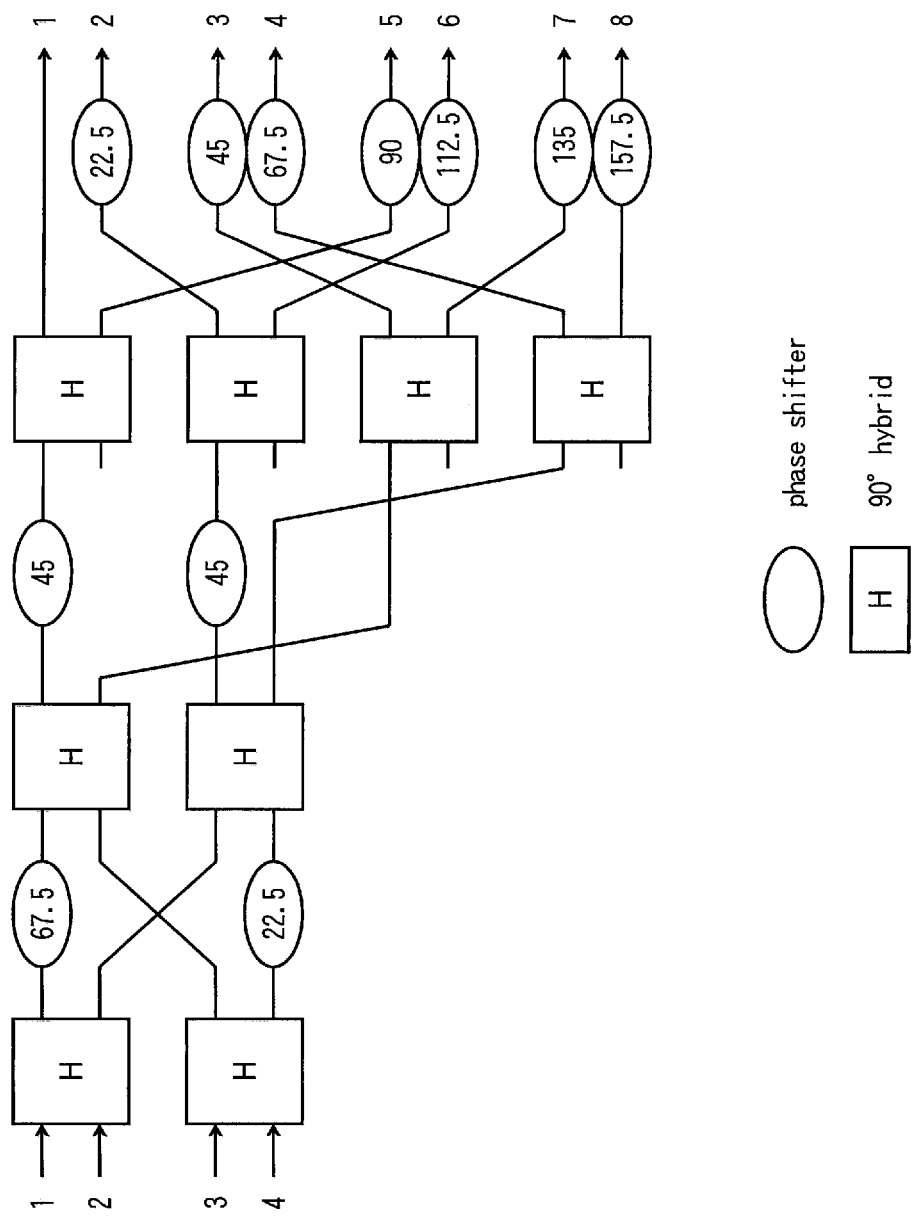
FIG. 9 is a diagram illustrating an example of a 4×8 Butler matrix.

As illustrated in FIG. 9, a port that is not used is terminated by using a termination device or the like, and thus an analog circuit scale may be reduced according to the maximum number of usage OAM modes.

Example 10

In Example 10, as an installation method of a transmitting antenna and a receiving antenna, a reflector or a lens of a parabola antenna is provided. Herein, antennae are disposed such that a propagation axis passing through the center of each UCA matches a symmetric axis of a paraboloid of the parabola antenna, and thus a high received signal gain can be obtained. In addition, for example, an offset parabola antenna installed to obtain similar beams may be used.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An orbital angular momentum (OAM) multiplexing communication system that subjects a plurality of signal sequences to multiplex transmission by using an OAM mode as a base in a rotational direction dimension, the OAM multiplexing communication system comprising:

a transmitting station including a transmitting antenna using a multi uniform circular array (M-UCA) formed of a plurality of uniform circular arrays (UCAs) that are concentrically disposed, each of the UCAs having a plurality of antenna elements disposed circularly at an equal interval, and a unit performing basis transformation in each of the rotational direction dimension and a diameter direction dimension in a polar coordinate system having a center of the plurality of UCAs as an origin, and subjecting the plurality of signal sequences to multiplex transmission for each complex mode formed by a combination of different bases in each dimension; and a receiving station including a receiving antenna using an M-UCA formed of a plurality of UCAs that are concentrically disposed, and a unit receiving a signal subjected to the multiplex transmission from the transmitting station, and demultiplexing the plurality of signal sequences subjected to the multiplex transmission.

2. The OAM multiplexing communication system according to claim 1, wherein:

the receiving station further includes a unit estimating channel information between the transmitting antenna and the receiving antenna by using a known reference signal transmitted from the transmitting station, and performing transform into a transmitting weight and a receiving weight used for basis transformation in the rotational direction and diameter direction dimensions by using the channel information;

the transmitting station further includes a weight multiplication unit multiplying the plurality of signal sequences by the transmitting weight fed back from the receiving station so as to perform basis transformation in the diameter direction dimension, and an OAM mode generation unit generating a signal in the OAM mode to be transmitted from each of the plurality of UCAs; and the receiving station further includes an OAM mode separation unit separating the signal in the OAM mode from a received signal of each of the plurality of UCAs, and a weight multiplication unit multiplying the signal in the OAM mode by the receiving weight so as to perform basis transformation in the diameter direction dimension.

3. The OAM multiplexing communication system according to claim 1, wherein:

the transmitting station is configured to include one of a function and a table in which a transmitting weight to be multiplied according to a distance between the transmitting antenna and the receiving antenna is set in advance, and multiply one or more signal sequences to be multiplexed for each OAM mode to be used by different transmitting weights so as to perform basis transformation for each of the UCAs; and the receiving station is configured to perform basis transformation for each of the UCAs, multiply one or more signal sequences differing for each OAM mode by receiving weights corresponding to the transmitting weights used in the transmitting station, and demultiplex the plurality of signal sequences subjected to the multiplex transmission by using a predetermined equalization algorithm.

4. The OAM multiplexing communication system according to claim 3, wherein:

the transmitting station is configured to determine the transmitting weight based on an orthogonal distribution function according to the distance between the antennae; and the receiving station is configured to determine the receiving weight based on the orthogonal distribution function used in the transmitting station according to the distance between the antennae.

5. The OAM multiplexing communication system according to claim 2 or 3, wherein the transmitting station and the receiving station further include a unit determining a combination of the transmitting weight and the receiving weight, and an orthogonal base based on reception signal quality in the available complex mode, and determining transmission power and a modulation method in the complex mode.

6. An orbital angular momentum (OAM) multiplexing communication method of subjecting a plurality of signal sequences to multiplex transmission by using an OAM mode as a base in a rotational direction dimension, the OAM multiplexing communication method comprising:

causing a transmitting antenna of a transmitting station to use a multi uniform circular array (M-UCA) formed of a plurality of uniform circular arrays (UCAs) that are concentrically disposed, each of the UCAs having a plurality of antenna elements disposed circularly at an equal interval, to perform basis transformation in each of the rotational direction dimension and a diameter direction dimension in a polar coordinate system having a center of the plurality of UCAs as an origin, and to subject the plurality of signal sequences to multiplex transmission for each complex mode formed by a combination of different bases in each dimension; and causing a receiving antenna of a receiving station to use an M-UCA formed of a plurality of UCAs that are concentrically disposed, to receive a signal subjected to the multiplex transmission from the transmitting station, and to demultiplex the plurality of signal sequences subjected to the multiplex transmission.

7. The OAM multiplexing communication method according to claim 6, wherein:

the receiving station estimates channel information between the transmitting antenna and the receiving antenna by using a known reference signal transmitted from the transmitting station, and performs transform into a transmitting weight and a receiving weight used for basis transformation in the rotational direction and diameter direction dimensions by using the channel information;

the transmitting station multiplies the plurality of signal sequences by the transmitting weight fed back from the receiving station so as to perform basis transformation in the diameter direction dimension, and generates a signal in the OAM mode to be transmitted from each of the plurality of UCAs; and the receiving station separates the signal in the OAM mode from a received signal of each of the plurality of UCAs, and multiplies the signal in the OAM mode by the receiving weight so as to perform basis transformation in the diameter direction dimension.

8. The OAM multiplexing communication method according to claim 6, wherein:

the transmitting station includes one of a function and a table in which a transmitting weight to be multiplied according to a distance between the transmitting antenna and the receiving antenna is set in advance, and multiplies one or more signal sequences to be multiplexed for each OAM mode to be used by different transmitting weights so as to perform basis transformation for each of the UCAs; and the receiving station performs basis transformation for each of the UCAs, multiplies one or more signal sequences differing for each OAM mode by receiving weights corresponding to the transmitting weights used in the transmitting station, and demultiplexes the plurality of signal sequences subjected to the multiplex transmission by using a predetermined equalization algorithm.

9. The OAM multiplexing communication method according to claim 8, wherein:

the transmitting station determines the transmitting weight based on an orthogonal distribution function according to the distance between the antennae; and the receiving station determines the receiving weight based on the orthogonal distribution function used in the transmitting station according to the distance between the antennae.

10. The OAM multiplexing communication method according to claim 7 or 8, wherein the transmitting station and the receiving station determine a combination of the transmitting weight and the receiving weight, and an orthogonal base based on reception signal quality in the available complex mode, and determine transmission power and a modulation method in the complex mode.

* * * * *